E. BROOKES.
APPARATUS FOR THE MANUFACTURE OF POTTERY.
APPLICATION FILED DEC. 23, 1916.
1,417,968.
Patented May 30, 1922.
3 SHEETS—SHEET 1.
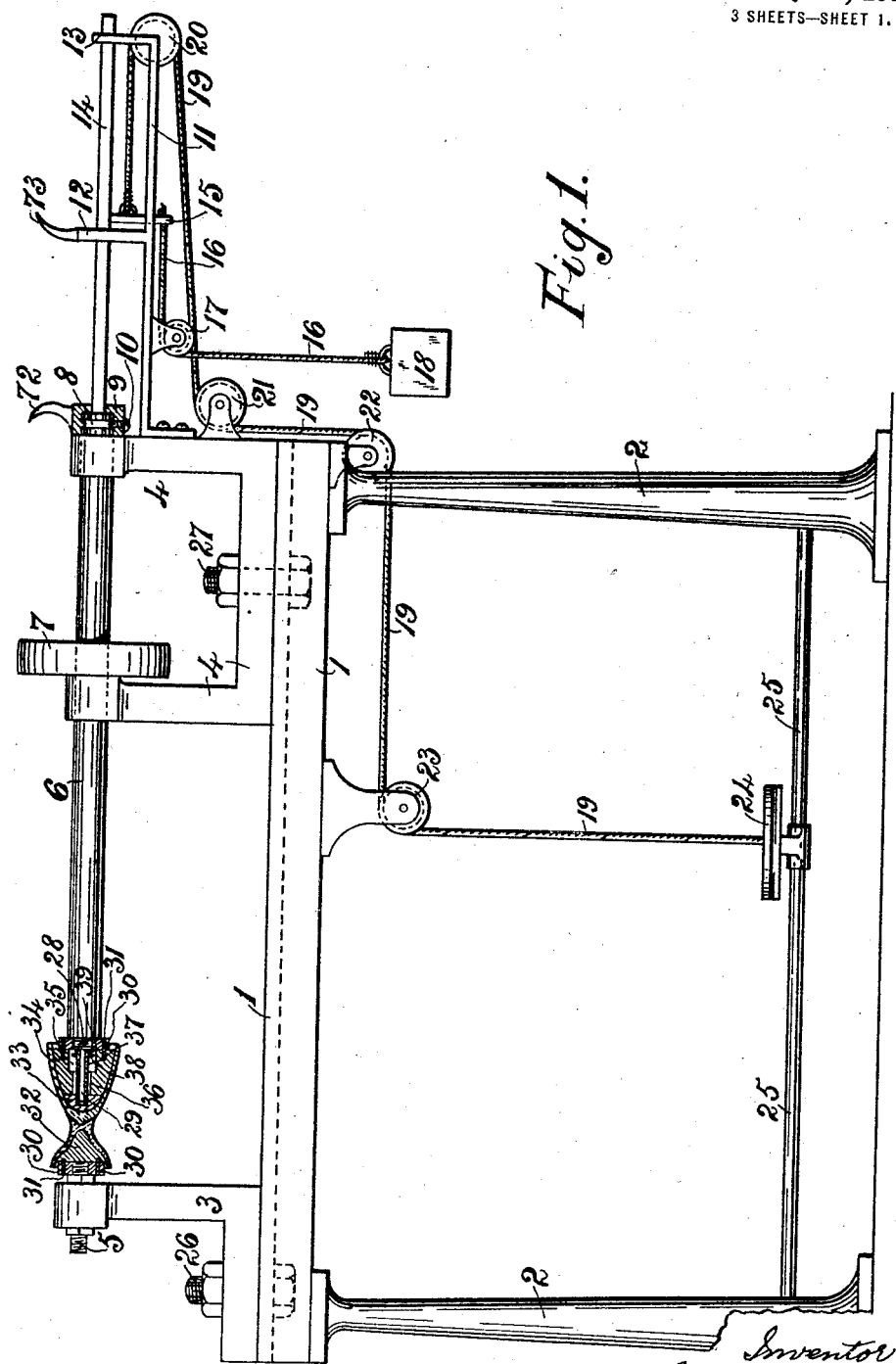

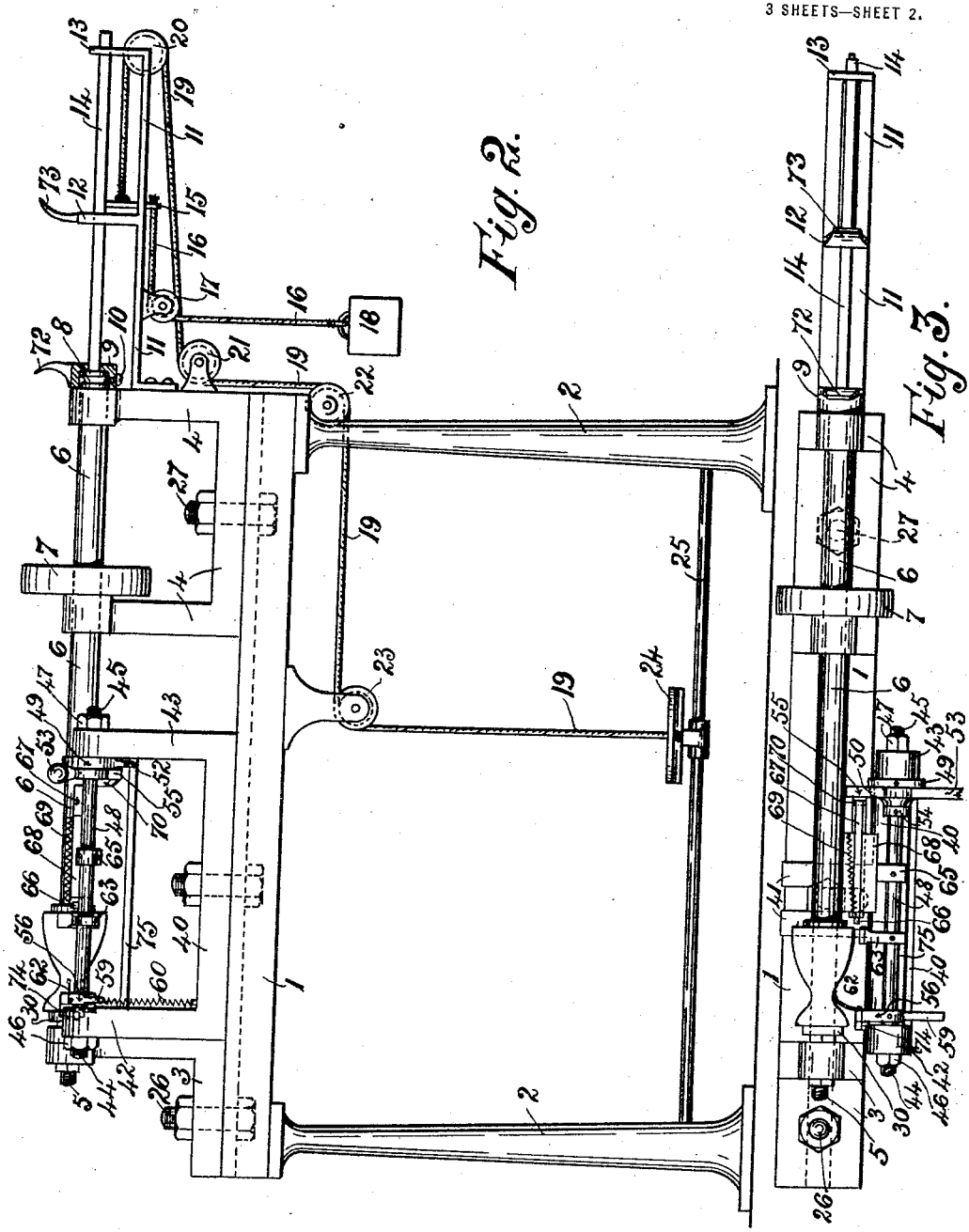

E. BROOKES.
APPARATUS FOR THE MANUFACTURE OF POTTERY.
APPLICATION FILED DEC. 23, 1916.

1,417,968.

Patented May 30, 1922.
3 SHEETS—SHEET 3.

Inventor
Elijah Brookes
by Herbert W. T. Jenner
Attorney

UNITED STATES PATENT OFFICE.

ELIJAH BROOKES, OF STOKE-ON-TRENT, ENGLAND.

APPARATUS FOR THE MANUFACTURE OF POTTERY.

1,417,968.  Specification of Letters Patent.  Patented May 30, 1922.

Application filed December 23, 1916. Serial No. 138,669.

(GRANTED UNDER THE PROVISIONS OF THE ACT OF MARCH 3, 1921, 41 STAT. L., 1313.)

*To all whom it may concern:*

Be it known that I, ELIJAH BROOKES, subject of the King of Great Britain and Ireland, and resident of Tunstall, Stoke-on-Trent, in the county of Stafford, England, earthenware manufacturer, have invented certain new and useful Apparatus for the Manufacture of Pottery, of which the following is a specification.

This invention relates to that class of apparatus in which articles of pottery after being formed are placed in a semi-plastic state upon a mandrel and the exterior or edges shaped by tools affixed to the apparatus and operable by hand.

The object of this invention is to construct such an apparatus whereby articles of pottery such as, cups, basins, mugs, and the like whether made from one or more pieces, can be trued up and the edge or edges of such articles cut or trimmed up and where an article is made from two or more pieces, the seam or seams can be burnished or smoothened and the joint closed, the operations being performed while the articles are in a semi-plastic condition previous to the baking and before the application of the handles or other devices.

In carrying out this invention I employ means for receiving and rotating the article to be operated upon, such means practically consisting of two revolved shafts placed end on and in alignment with each other and each carrying a block or chuck previously shaped to the contour of the article to be treated, one corresponding to the base or bottom of the article and the other to the inside of the article.

I also employ devices capable of actuation for cutting off and trimming the edge or edges of the article and of rounding same, and in cases where the article is made up of two or more pieces I also provide means whereby the seam or seams may be burnished and smoothened and the joint or joints filled up; and further to enable the article to be constructed in the first place so that I can effect a proper cutting, trimming or flattening of the edge or edges, I create a certain improvement in the mould wherein such article or piece of an article is cast.

The mould can be filled and the apparatus worked by unskilled labour, and with due diligence every article as it leaves the apparatus is of exact shape and size.

The following description aided by the accompanying drawings will indicate a construction of apparatus and mould as in accordance with my invention.

Figure 1 is a front elevation of the apparatus showing the article being operated upon as an egg cup formed of two pieces, the egg cup and blocks or chucks holding same being in section whilst the appliance carrying the cutters and the like is removed.

Figure 2 is a front elevation of the apparatus showing the cutters and other appliances and their carrier in position.

Figure 3 is a plan of Figure 2.

Figures 4 to 10 are enlarged views.

Figure 4:
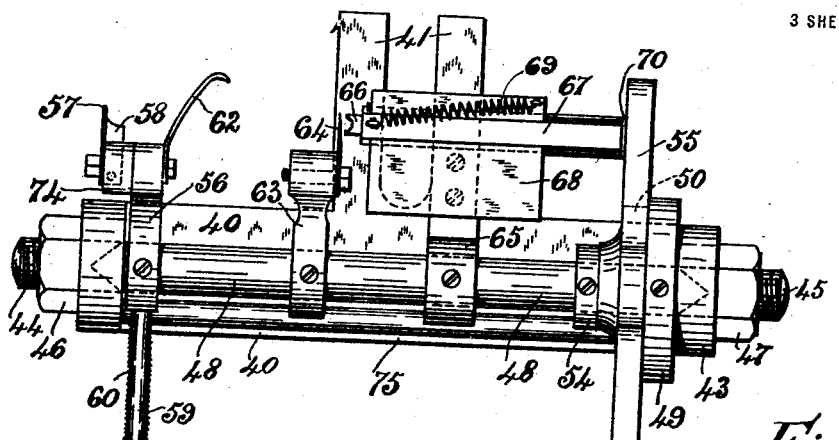
Figure 4 is a plan of the cutters and like appliances and their carrier assembled.

1 is a base formed after the manner of a lathe bed i. e. with a slot running from one end to the other such base 1 being secured to a stand 2 or mounted upon a table as desired.

The base 1 carries two adjustable heads 3, 4, the head 3 carrying, preferably, in ball bearings a short shaft 5 both ends of which are preferably screw threaded, the other head 4 which is of a double character carrying a sliding revolvable shaft 6, such shaft 6 carrying a pulley wheel 7 positioned within the head 4, and one end of the shaft 6 is formed with a groove 8 and engages a collar 9 which is held to the shaft 6 by a screw nut 10 engaging the groove 8 which not only holds the collar 9 to the shaft 6 but allows of the shaft 6 revolving in the collar 9.

Attached to the head 4 is a bracket 11 this having two walls 12, 13, provided with holes through which is passed a square or shaped rod 14, one end of which is fixedly connected to the collar 9. Depending from the rod 14 is an arm 15 to which is attached a cord 16 which is rove over a pulley 17 attached to the bracket 11 and connected to a weight 18, which weight normally keeps the rod 6 projected from the head 4.

Attached to the arm 15 is another cord 19 which is passed over a pulley 20 secured to the bracket 11 and over other pulleys 21, 22, 23, secured to the head and the base to a foot plate 24 projecting from a shaft 25 journalled in the frame 2 so that by pressure on the foot plate 24 the shaft 6 will be moved in a reverse direction to that effected by the weight 18.

The shafts 5 and 6 are in alignment and the positions of the heads 3 and 4 are variable to suit the article which is to be operated upon and such heads are held to the base by bolts 26, 27, in the well known manner.

Figure 10:
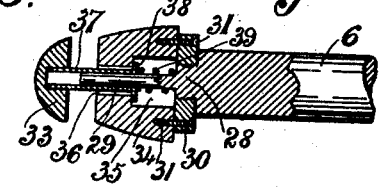
Figure 10 is a section of the block or chuck for engaging the inside of the body of the egg cup.

The shaft 6 is constructed at its free end, see especially Figure 10, with a reduced screw threaded portion 28 from which extends a continuation or stem 29 of still smaller diameter.

The shaft 5 as before stated is preferably provided at both ends with a screw thread one of which is to carry the block or chuck for carrying one end or bottom of the article to be operated upon whilst the other screw threaded end may have a pulley applied thereto so that the shaft 5 can be revolved through the pulley by a belt in the known manner and act as in a lathe for enabling the blocks or chucks to be turned to the desired size and shape on this apparatus instead of being turned on a separate lathe as will be well understood.

In preparing the wood for this turning operation I attach thereto a screw threaded nut 30 by screws 31 and by screwing this nut on to the shaft 5 the wood can be turned as desired, the ordinary tool holding or resting appliances being secured to the base 1 in the ordinary manner. In such manner either block or mould can be turned on the shaft 5 the screw threaded portion of reduced diameter of the shaft 6 being of the same diameter and pitch so that in all cases the blocks or chucks when in position for working will be centralized with each other.

The block or chuck 32 which is to be attached to the shaft 5 is made in a single piece, whilst the block which is to be attached to the shaft 6 after it has been turned to the proper shape and size is cut transversely into two portions 33, 34, the block portion 34 having a circular recessed portion 35 and being provided with a hole 36 centrally.

Within the hole 36 of the block portion 34 is positioned a tube 37 this having a collar 38 at one end and positioned with the circular recessed portion 35 and surrounding the stem 29 and between the collar 38 and the shaft 6 is a light helical spring 39 which normally keeps the tube 37 extended beyond the block portion 34; on the end of the tube 37 is positioned the other portion 33 of the block which forms a nose piece, its purpose in action being hereafter explained.

On the base 1 is adjustably positioned a carrier 40 this having a bifurcated or slotted base portion 41 which rests on the base 1 and is secured thereto by bolt and nut in the same manner as the heads 3, 4. From this carrier 40 extends upright arms 42, 43, in screw threaded holes of which are positioned two cone end bearing pins 44, 45, capable of being locked in position by the lock nuts 46, 47, and such bearing pins have freely pivoted between them a shaft 48.

On this shaft 48 is positioned the cutting, smoothening, shaping and other tools required during the various operations on the article under treatment and as in the drawings I have shown an egg cup under treatment I also show the tools necessary for operating upon that egg cup.

Figure 5:
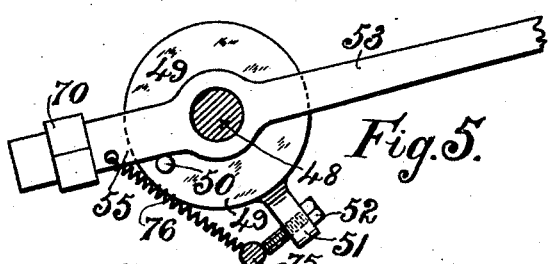
Figures 5, 6, 7 and 8, are detail views of the appliances for cutting, smoothening, and rounding the article and of the lever for operating them, each being shown separately and approximately at the respective angles with regard to each other on their carrying rod.
Figure 6:
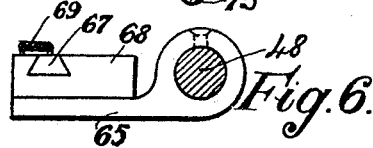
Figure 7:
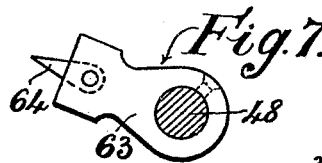
Figure 9:
Figure 9 is a section of the block or chuck and its carrying washer for engaging the bottom of an egg cup.

This shaft 48 is as before stated free to oscillate in the bearing pins 44, 45 and to enable such oscillations to be effected I fix to the shaft a collar 49 such collar having a pin 50 and a lug 51 carrying a screw 52, the pin 50 and the lug 51 being positioned on opposite side to the vertical line of the axle 48 as will be understood from Figure 5.

On the shaft 48, I also position a hand lever 53 this being loosely journalled thereon and moving between the fixed collar 49 and another collar 54 also fixed to the shaft.

The hand lever 53 has an extension 55 which when the lever 53 is moved in one direction will have action upon the pin 50 to carry the collar 49 and shaft 48 around in one direction as will be hereafter explained.

Figure 8:
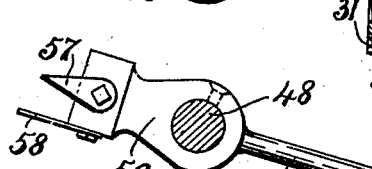
Figure 11:
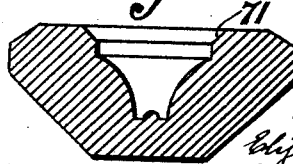
Figure 11 is a sectional elevation of a mould constructed for carrying out my invention and shaped for casting the bottom of an egg cup.

On the shaft 48 is secured the tools and their holders which perform the necessary operations. The tools and their holder for cutting off and flattening the bottom and rounding the bottom edge of the egg cup are such as is shown in Figure 8 and the holder 56 is provided on one side with a thin sharp knife 57 and a thin shaping tool 58 on the bottom, the knife 57 cutting off the surplus material whilst the tool 58 as will be seen by the shape shown in Figure 4 will flatten the bottom portion of the egg cup and will also round its edge. The block or chuck 32 being always larger than the nut 30 to allow of this being done.

This holder 56 is provided with an arm 59 which carries a helical spring 60 one end of which is secured to the carrier 40 and normally tends to keep the whole of the tools in the raised position but such spring may be connected to an arm separately attached to the shaft 48.

For smoothening or burnishing the seam and filling up the joint of the egg cup I attach to the holder 56 a piece of bent spring wire 62 the free end of which is shaped to the exterior of the egg cup at the joint portion and has action against same to smooth or burnish same and fill up the joint at the end of the movement of the shaft 48 as will be hereafter explained.

The holder 63 for the tool 64 which also consists of a thin knife blade is also secured to the shaft 48 as also is the holder 65 which carries the tool for rounding the edge of the top of the egg cup. In this case the tool 66 is reciprocated in a line parallel to the shaft 48 and is formed with a recessed end as will be understood from Figure 4 such tool 66 being secured to a sliding V rod 67 held in a V track of a block 68 secured to the holder 65 and such V rod 67 is normally pressed in one direction by the tension of a spring 69 secured to the rod 67 and the block 68 as will be understood from Figure 4.

The free end of the free rod 67 is made of V shape and is normally pressed against a V shaped surface cam 70 fitted on the extension 55 of the lever 53, the block 68 being positioned accordingly.

All these holders are positioned on the shaft 48 as to distance from one another and angularity with regard to each other and the carrier 40 is positioned in accordance with the size of the article to be operated upon and as will be understood when tea or breakfast cups, basins and like which are made in one casting or only require the top edge to be shaped the carrier 56 and its appurtenances may be dispensed with.

In constructing the mould in which the articles to be treated in this apparatus are to be made I form at the top edge of the mould a splayed out extension 71 such splayed out extension 71 having a curved or angled edge or surface emanating outwards from the edge or ends of that portion of the mould which has been shaped to form the article proper, so that when the mould is fitted in the ordinary way of casting there will be an angled or curved extension formed at the edge of the article which will prevent ribs, undulations or the like forming on the inside edge of the article as is always the case when made in an ordinary mould; and by cutting off the extension, splayed out portion or ring the article is rendered perfect from that point and further it enables the block or chuck to properly and fully fit the inside of the article and thus retain the shape given it by the mould.

72 is a thumb piece fixed on the collar 9 and 73 is a thumb piece of the wall 12 so that by the operator engaging these two thumb pieces by the hand the shaft 6 can be pulled by hand instead of using the treadle 24.

76 is a spring connected to the handle 53 and the stop 75 to normally keep the tools in the lowermost position.

Instead of employing the spring 60 in the manner indicated I may employ one or more springs to hold the tools in both the raised and lowermost positions, the spring or springs coming into action when its or their point of suspension has passed a dead centre in the well known manner.

The action and working of the apparatus is as follows:—In the first place the blocks or chucks suitable for the article to be operated upon are connected to their respective shafts 5, 6, and the operator has moved the lever 53 for the cutting tools to be at their lowermost position and has also moved the shaft 6 for the chucks to be opened out to their greatest distance apart, an egg cup is then taken by the operator and held in position lightly in the hand in alignment with the chucks and with the bottom of the egg cup on its chuck.

In lowering the tools to enable the egg cup to be placed in position in the chucks the operator first grasps the handle 53 and lifts it, this causing the cam 70 to have action upon the sliding rod 67 and move it, the extension 55 then comes against the stop 50 on the collar 49 and the continued movement of the handle moves the collar 49 and the shaft 48 and with it the tools and their holders to the lowermost position until the holder 56 by its projection 74 comes against the arm 42 which prevents its further movement. During the movement of the collar 49 the lug 51 has been moved.

The operator now releases the shaft 6 when the weight 18 will move such shaft towards the egg cup when the nose piece 33 will find a resting place in the bottom of the body of the egg cup, the continued motion of the falling weight 18 further moving the shaft and overcoming the tension of the spring 39 which acting as a slight resistance to the weight 18 allows of an easy positioning of the chuck portion 34 in the inside of the body of the egg cup until such block 34 reaches the nose portion 33 and the two fill the inside of the egg cup.

During the whole of this and all operations the shaft 6 is continuously revolving at a fair speed say 500 revolutions a minute, so that the egg cup must be held lightly in the hand and is practically freed therefrom the moment the nose piece 33 grips the egg cup and the heaviness and action of the weight 18 is only just sufficient to ensure a fair grip of the egg cup between the two chucks without in any way damaging the egg cup or altering its shape and as these chucks grip the egg cup they cause both pieces to assume their proper positions in relation to each other, i. e. the article is trued up, this being especially the case when the two portions are not properly cemented together in alignment with each other.

The operator now allows or moves the handle downwards and in so doing the tools are lifted to perform their work, the tool 57 cutting the extension off the bottom of the egg cup the tool 58 flattening and rounding the bottom edge of the egg cup, whilst the tool 64 cuts off the extension on the top edge of the egg cup and as soon as this is done the knives 57 and 64 and shaper 58 have passed beyond the egg cup they have reached the end of their movement by reason of the screw 52 having come against a stop 75 on the arm 43 or it may be a rod connecting the two arms 42, 43, which prevents any further movement of the shaft 48 but leaving the handle free however the continued movement of the handle will cause its cam 70 to reciprocate the rod 67 and cause its tool 66 to engage the edge of the egg cup and round same, thus completing the action of the egg cup.

On the reverse movement of the handle 53 as before explained all the tools and scrapers will perform the same action on the egg cup, but such movements have no effect thereon as the work has already been done, and the handle 53 will be held in an upright position by the helical spring 76.

The position of the cutters and shapers with regard to the article under operation are such that the action of the knives or shapers upon the article are of such a degree that only the necessary contact with the article is effected.

It will be seen that only the shaft 6 is revolved, shaft 5 being revolved through the medium of the egg cup such shaft 5 being easy of rotation prevents any strain being put upon the egg cup owing to the weight being of such a character as not to have more than a sufficient hold between the two chucks.

What I claim as my invention and desire to secure by Letters Patent is:—

1. In apparatus for the manufacture of pottery, two supporting heads, two opposed chucks revoluble in the said heads, means for gripping the article between the said chucks, and means for shaping the article while being revolved with the chucks.

2. In apparatus for the manufacture of pottery, two supporting heads, a chuck revoluble in one head, a shaft revoluble and slidable in the other head, a chuck secured to the said shaft, means for sliding the said shaft longitudinally to grip the article between the chucks, and means for shaping the article while being revolved with the chucks.

3. In apparatus for the manufacture of pottery, two supporting heads, a chuck revoluble in one head, a shaft revoluble and slidable in the other head, a chuck secured to the said shaft and formed in sections arranged end to end and provided with a spring which normally projects the outer section forwardly, means for sliding the said shaft longitudinally to grip the article between the chucks, and means for shaping the article while being revolved with the chucks.

4. In apparatus for the manufacture of pottery, two supporting heads, a chuck revoluble in one head, a shaft revoluble and slidable in the other head, a chuck secured to the said shaft, a non-revoluble rod operatively connected with the said shaft, an automatic actuating device for pressing the said rod and shaft forwardly, means for retracting the said rod and shaft at will, and means for shaping the article while being revolved with the chucks.

In testimony whereof I have hereunto set my hand in the presence of two witnesses.

ELIJAH BROOKES.

Witnesses:
J. BENTON,
J. H. COPESTAKE.